(No Model.)
J. E. KELLY.
STEAM EXHAUST HEAD.
No. 544,810. Patented Aug. 20, 1895.
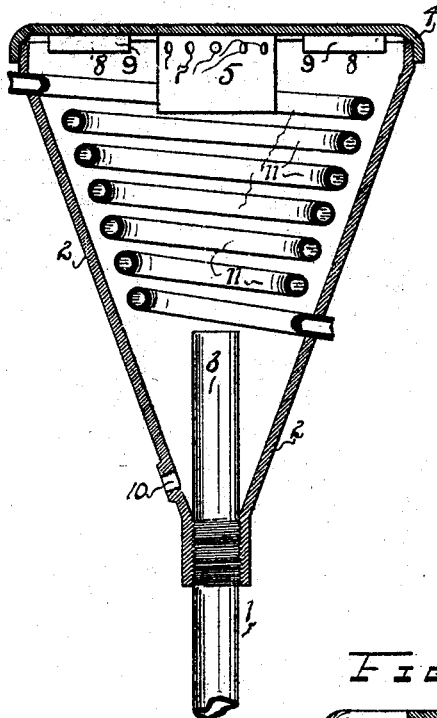
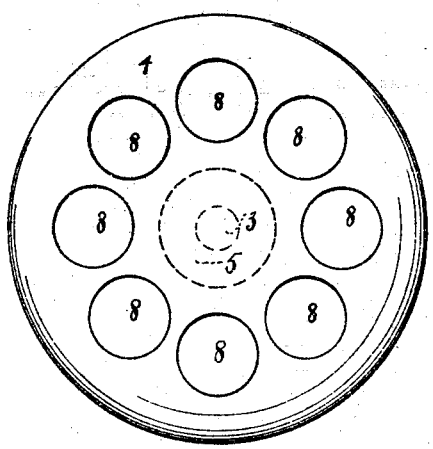
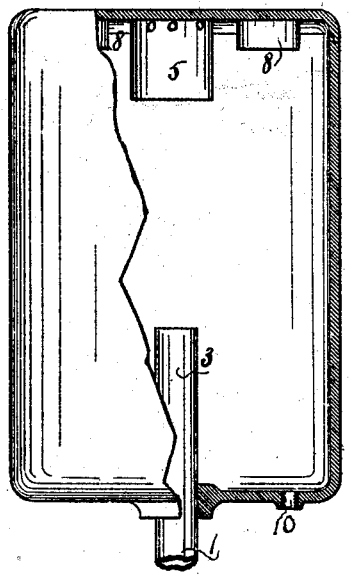
Witnesses:
Inventor.
John E. Kelly
Attorney.

UNITED STATES PATENT OFFICE.

JOHN E. KELLY, OF JOHNSONBURG, PENNSYLVANIA.

STEAM-EXHAUST HEAD.

SPECIFICATION forming part of Letters Patent No. 544,810, dated August 20, 1895.

Application filed January 5, 1895. Serial No. 533,989. (No model.)

*To all whom it may concern:*

Be it known that I, JOHN E. KELLY, a citizen of the United States, residing at Johnsonburg, in the county of Elk and State of Pennsylvania, have invented certain new and useful Improvements in Steam-Exhaust Heads; and I do hereby declare the following to be a sufficiently full, clear, and exact description thereof as to enable others skilled in the art to make and use the said invention.

This invention relates to the terminal or exhaust heads of pipes for discharging exhaust-steam from high-pressure engines, and has for its object the economical production of such exhaust-heads of great durability, and the precipitation of water from the exhaust-steam and the collection thereof without annoyance from the scattering of the water in showers with the discharge of steam.

To this end the invention consists of a funnel attached to the upper portion of the exhaust-pipe, in vertical position, with the exhaust-pipe extending some little distance therein, a cover on said funnel provided with an inverted cup placed centrally over the exhaust-pipe, and a number of apertures in the cover having downwardly-projected rims through which steam may escape freely and which deflect water downwardly into the lower part of the funnel away from the flow of steam issuing from the exhaust-pipe, and also in a series of apertures formed in the inverted cup, whereby portions of the steam readily escape, while the water is precipitated by said cup to the lower part of the funnel. A draining-aperture is made in the side of the funnel near the lowest point, so that the water of condensation and precipitation can be readily withdrawn.

To better utilize the heat of the escaping steam I sometimes introduce a conical pipe, through which water may be circulated and warmed for either boiler-feeding purposes or for other uses.

The accompanying drawings show a vertical section in Figure 1, a plan or top view in Fig. 2, and a modification in Fig. 3.

1 represents the upper end of an exhaust-pipe. 2 is a funnel secured thereon; 3, an extension of the exhaust-pipe, reaching up a small distance in the funnel.

4 is a top or a cover to the funnel, which may be formed integrally therewith, but is preferably made separate and attached thereto.

5 is an inverted cup, formed with the cover and having apertures 7 at the upper part of its sides near its juncture with the plate of the cover.

8 are apertures formed in the top plate or cover near the rim of the funnel, and 9 are rims surrounding the apertures 8 projecting downwardly from the top plate a short distance into the funnel.

10 is an escape or drip aperture near the lower part of the funnel.

11 is a coil of pipe of conical form placed within the funnel near the upper portion, through which water may be circulated to warm it.

Instead of a conical funnel a cylindric vessel may be used, as shown in Fig. 3.

In operation a current of exhaust-steam passing upwardly through the pipe 1 and the extension 3 strikes within the inverted central cup 5, and water carried mechanically with the steam by its greater momentum striking the top plate is deflected downwardly. A part of the steam escapes through the apertures 7 near the upper portion of the cup. The column of steam is thus spread, and moving with much lower velocity is deflected downwardly into the body of the funnel and thence rises, the water by its momentum consequent on its greater weight being precipitated into the lower part of the funnel below the flow of steam around the pipe 1, while the steam escapes freely through apertures 8 in the top plate 4. The downwardly-projected rims 9 arrest any drops of water that might be carried forcibly with the current sidewise toward the apertures in the top plate, thus free escape of steam with but very little resistance or back-pressure is provided, and the effectual precipitation of water mechanically carried with the steam is thereby secured, and the condensed and precipitated water is withdrawn through the lower aperture 10 at the side of the funnel.

Having described this invention and the operation thereof, what I claim is—

1. An exhaust head consisting of a funnel in axial line with the steam pipe, a pipe extension leading up centrally in said funnel in combination with a closed cover fitted thereon having a central inverted perforated cup attached thereto and a series of deflecting rims surrounding apertures formed in said cover, and all arranged to operate substantially as and for the purpose set forth.

2. In an exhaust head a funnel having a closed top, and pipe extension leading upwardly through part of the length of said funnel, from the exhaust inlet, a draining outlet, and a central inverted perforated cup and a series of deflecting rims, surrounding apertures located in outer portion of the cover, in combination with a conical coil of pipe arranged to absorb heat and condense steam within the exhaust head, substantially as and for the purpose set forth.

JOHN E. KELLY.

Witnesses:
S. C. PARSHALL,
JAS. McCLOSKEY.